United States Patent
Takayama et al.

(10) Patent No.: US 7,294,157 B2
(45) Date of Patent: Nov. 13, 2007

(54) CARBON MONOXIDE CONVERTER

(75) Inventors: Masako Takayama, Saitama-ken (JP); Hikaru Okada, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 11/063,724

(22) Filed: Feb. 24, 2005

(65) Prior Publication Data

US 2005/0193626 A1 Sep. 8, 2005

Related U.S. Application Data

(60) Provisional application No. 60/547,069, filed on Feb. 25, 2004.

(51) Int. Cl.
*C10J 3/84* (2006.01)

(52) U.S. Cl. .................. 48/128; 48/61; 48/127.9; 48/198.3; 422/191; 422/193; 422/198

(58) Field of Classification Search .............. 48/61, 48/127.9, 128, 127.7, 198.3; 422/188, 189, 422/190, 193, 198
See application file for complete search history.

(56) References Cited

U.S. PATENT DOCUMENTS

| | | | | |
|---|---|---|---|---|
| 6,126,908 A | * | 10/2000 | Clawson et al. | 422/190 |
| 6,190,623 B1 | * | 2/2001 | Sanger et al. | 422/192 |
| 6,548,029 B1 | * | 4/2003 | Towler et al. | 422/230 |
| 6,670,062 B2 | * | 12/2003 | Rush, Jr. | 429/20 |
| 6,972,119 B2 | * | 12/2005 | Taguchi et al. | 422/188 |
| 2002/0141909 A1 | * | 10/2002 | Takayama et al. | 422/168 |

FOREIGN PATENT DOCUMENTS

| | | |
|---|---|---|
| JP | 06-140068 | 5/1994 |
| JP | 07-232901 | 9/1995 |
| JP | 09-268001 | 10/1997 |
| JP | 11-199202 | 7/1999 |
| JP | 2001-180911 A1 | 7/2001 |
| JP | 2002-216827 A1 | 8/2002 |
| JP | 2002-243707 A1 | 8/2002 |

* cited by examiner

*Primary Examiner*—Basia Ridley
(74) *Attorney, Agent, or Firm*—Arent Fox LLP

(57) ABSTRACT

A carbon monoxide converter whose catalyst temperatures can be precisely controlled even under a high load. The carbon monoxide converter includes shift catalyst beds arranged in tandem for conducting a shift reaction for converting CO and $H_2O$ to $H_2$ and $CO_2$. The shift catalyst beds are arranged in a gas flow direction such that they are shorter on the upstream side, on which a gas containing CO and $H_2O$ is introduced, and longer on the downstream side, on which a gas containing the produced $H_2$ and $CO_2$ is discharged. A heat exchanger is disposed upstream of each shift catalyst bed, and the temperatures of the shift catalyst beds are controlled during the shift reaction. A gas containing $CO_2$ and $H_2O$ discharged from the carbon monoxide converter is introduced into a carbon-monoxide-oxidizing unit.

4 Claims, 5 Drawing Sheets

Reformed Gas
32 (33)

CARBON MONOXIDE CONVERTER

This nonprovisional application claims the benefit of U.S. Provisional Application No. 60/547,069, filed Feb. 25, 2004.

FIELD OF THE INVENTION

The present invention relates to a carbon monoxide converter for efficiently converting carbon monoxide to hydrogen by a shift reaction, particularly to a carbon monoxide converter for efficiently converting carbon monoxide in a reformed gas for a fuel cell.

BACKGROUND OF THE INVENTION

Solid polymer electrolyte fuel cells are attracting much attention as low-pollution power sources not only for stationary applications but also for vehicle applications. The fuel cells utilize a compressed hydrogen gas, a high-purity hydrogen gas supplied from a liquid hydrogen tank, or a hydrogen-rich gas prepared by reforming an alcohol such as methanol or a hydrocarbon such as gasoline using a reformer. However, it is known that carbon monoxide or impurities in the hydrogen-rich gas act as poison to platinum in an anode catalyst in some low-temperature fuel cells, lowering the output. To reduce carbon monoxide in the hydrogen-rich gas, the reformed gas is subjected to a shift reaction ($CO+H_2O \rightarrow CO_2+H_2$), or an oxidation reaction ($CO+\frac{1}{2}O_2 \rightarrow CO_2$). See, for instance, JP 2002-243707 A, JP 2002-216827 A, JP 11-199202 A, JP 9-268001 A, JP 2001-180911 A, JP 7-232901 A and JP 6-140068 A.

However, an exothermic shift reaction elevates a catalyst temperature as going downstream through catalyst beds, resulting in a lowered CO conversion and a deteriorated catalyst. Carbon monoxide converters having catalyst beds with coolant flow paths are disclosed in JP 2002-216827 A, JP 11-199202 A, JP 9-268001 A, JP 2001-180911 A, JP 7-232901 A and JP 6-140068 A. For example, JP 2002-216827 A describes a carbon monoxide converter comprising a catalyst bed with a coolant flow path in contact with the catalyst, a cooling surface area of the coolant flow path being reduced continuously or stepwise in a gas flow direction to appropriately control a temperature distribution in the converter. However, this carbon monoxide converter fails to sufficiently control the temperature under a high load, resulting in deteriorating the catalyst. This carbon monoxide converter thus should be operated under a low load, failing to reduce the amount of a costly catalyst. The carbon monoxide converter described in JP 2001-180911 A comprises a heat exchanger axially connected to the upstream side of a catalyst bed. However, this carbon monoxide converter is also disadvantageous in that the temperature is not sufficiently controlled under a high load, resulting in deteriorating the catalyst.

OBJECT OF THE INVENTION

Accordingly, an object of the present invention is to provide a less expensive carbon monoxide converter whose catalyst temperatures can be precisely controlled even under a high load, with excellent catalyst durability.

SUMMARY OF THE INVENTION

As a result of intense research in view of the above object, the inventors have found that rapid elevation of catalyst temperatures in a carbon monoxide converter can be prevented for an efficient reaction, by arranging shift catalyst beds in tandem such that a shorter catalyst bed is disposed on the upstream side generating larger heat (upstream stage), while a longer catalyst bed is disposed on the downstream side (downstream stage). The inventors have further found that the catalyst temperatures can be precisely controlled by a heat exchanger upstream of each shift catalyst bed to adjust the temperature of a reformed gas. The present invention has been accomplished by these findings.

Thus, the carbon monoxide converter of the present invention comprises shift catalyst beds arranged in tandem for conducting a shift reaction for converting CO and $H_2O$ to $H_2$ and $CO_2$.

The catalyst temperatures in the carbon monoxide converter are controlled by arranging the shift catalyst beds in tandem, thereby efficiently reducing the concentration of CO in a reformed gas. The shift catalyst beds are preferably arranged in a gas flow direction such that they are shorter on the upstream side, on which a gas containing CO and $H_2O$ is introduced, and longer on the downstream side, on which a gas containing the produced $H_2$ and $CO_2$ is discharged. A rapid reaction can be prevented by making the catalyst bed shorter at an upstream stage generating large heat. The deterioration of the catalyst can be prevented by controlling the temperatures of the shift catalyst beds to 330° C. or lower during the shift reaction. To achieve such precise control, a heat exchanger is preferably disposed upstream of each shift catalyst bed. The catalyst temperatures can be maintained within a predetermined range by controlling the gas temperature at the inlet of each catalyst bed using a temperature sensor disposed at the inlet.

The shift catalyst beds preferably contain a shift catalyst of Pt supported on an oxide carrier. Pt, which is highly active even at relatively low temperatures, can highly efficiently convert carbon monoxide in the reformed gas at relatively low temperatures with little influence of a reverse shift reaction ($CO_2+H_2 \rightarrow CO+H_2O$).

DETAILED DESCRIPTION OF THE PREFERRED EMBODIMENTS

[1] Fuel Cell System

Figure 1:
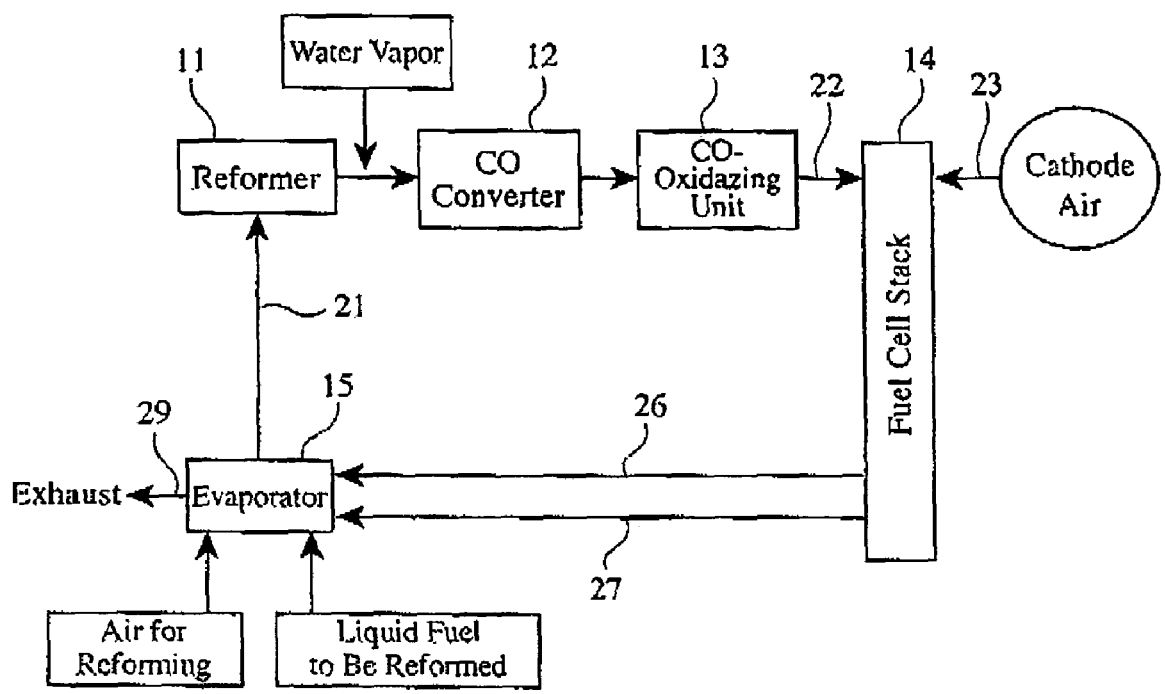
FIG. 1 is a view showing an example of fuel cell systems.

FIG. 1 shows an example of fuel cell systems, which comprises a reformer 11, a carbon monoxide converter 12, a carbon-monoxide-oxidizing unit 13, a fuel cell stack (fuel cell) 14, and an evaporator 15.

The fuel cell stack 14 comprises pluralities of stacked fuel cell units. Each fuel cell unit generates electricity by an electrochemical reaction between hydrogen in a fuel gas supplied to an anode and an oxidant gas (oxygen in air) supplied to a cathode. Used as the fuel gas supplied to an anode is a hydrogen-rich gas (reformed gas) produced by heating a liquid fuel such as an alcohol (methanol, ethanol, propanol, butanol, etc.) or a hydrocarbon (methane, ethane, propane, butane, gasoline, etc.) in the evaporator 15 and reforming the resultant fuel vapor in the reformer 11. The hydrogen-rich gas is supplied as a fuel gas to the anode. As shown in FIG. 1, tile liquid fuel to be reformed is supplied together with air to the evaporator 15, where it is evaporated. A mixture of the resultant fuel vapor and the heated air is supplied from the evaporator 15 to the reformer 11 through a fuel supply pipe 21. The fuel vapor generated in the evaporator 15 is partially oxidized by the air in the presence of the reforming catalyst in the reformer 11 to produce a reformed gas. The reforming catalyst, which may be appropriately selected depending on the type of the liquid fuel, etc., is, for instance, a noble metal catalyst of palladium (Pd), nickel (Ni), copper (Cu), etc.

After the reformed gas produced in the reformer 11 is mixed with water vapor, carbon monoxide in the reformed gas is reacted with water vapor in the carbon monoxide converter 12 to form carbon dioxide and hydrogen. The reformed gas discharged from the carbon monoxide converter 12 is mixed with air for removing carbon monoxide, and cooled to a predetermined temperature. The residual carbon monoxide in the reformed gas is then oxidized to carbon dioxide by a selective carbon-monoxide-oxidizing catalyst 11 the carbon-monoxide-oxidizing unit 13. The reformer 11 may conduct not only partial oxidation as in this embodiment, but also steam reforming or an internal combustion comprising partial oxidation and steam reforming, etc. In the case of a phosphoric acid fuel cell (PAFC), etc., there is no need to use the carbon-monoxide-oxidizing unit 13.

The reformed gas containing carbon monoxide whose concentration is reduced to a predetermined level or less by the carbon monoxide converter 12 and the carbon-monoxide-oxidizing unit 13, is supplied to the anode of the fuel cell stack 14 through a fuel gas supply pipe 22, and an oxidant gas (air) is supplied from a supercharger (not shown) to the cathode of the fuel cell stack 14 through an air supply pipe 23.

After the fuel gas supplied to the anode of the fuel cell stack 14 and the air supplied to the cathode are used to generate electricity, they are sent to a catalytic combustor in the evaporator 15 through a fuel off-gas pipe 26 and an air off-gas pipe 27, respectively, and burned in the catalytic combustor to heat the liquid fuel and the reforming air supplied to the evaporator 15. The combustion gas produced by the fuel off-gas and the air off-gas is discharged through an exhaust pipe 29.

[2] Carbon Monoxide Converter

Figure 2:
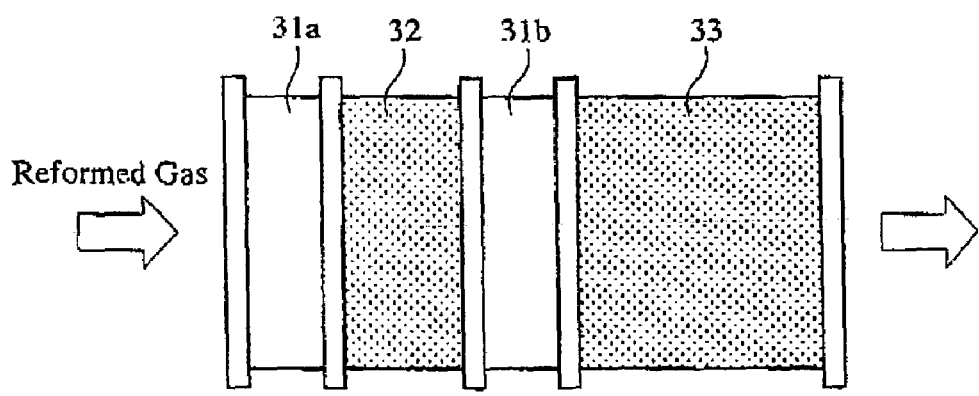
FIG. 2 is a schematic view showing the structure of the carbon monoxide converter of Example 1.

The carbon monoxide converter of the present invention comprises shift catalyst beds in tandem. FIG. 2 shows a carbon monoxide converter according to an embodiment of the present invention. A first-stage catalyst bed (shift catalyst bed 32) and a second-stage catalyst bed (shift catalyst bed 33) are arranged in this order from the upstream side in a gas flow direction. The first-stage catalyst bed is shorter than the second-stage catalyst bed in the gas flow direction, with each heat exchanger 31a, 31b disposed upstream of each catalyst bed.

The structure of each shift catalyst bed is not particularly restricted as long as the catalyst bed can efficiently catalyze the shift reaction. For example, it may be a cylindrical vessel having an inlet and an outlet for the reformed gas and filled with particles, pellets, etc. of the shift catalyst. Further, each shift catalyst bed maybe a honeycomb catalyst bed shown in FIG. 3. The honeycomb catalyst bed is aligned with the reformed gas flow to permit the reformed gas to pass through. The shift catalyst is carried on walls of the honeycomb catalyst bed in a reformed gas flow path, such that the shift reaction proceeds while the reformed gas passes through the catalyst bed.

Figure 4:
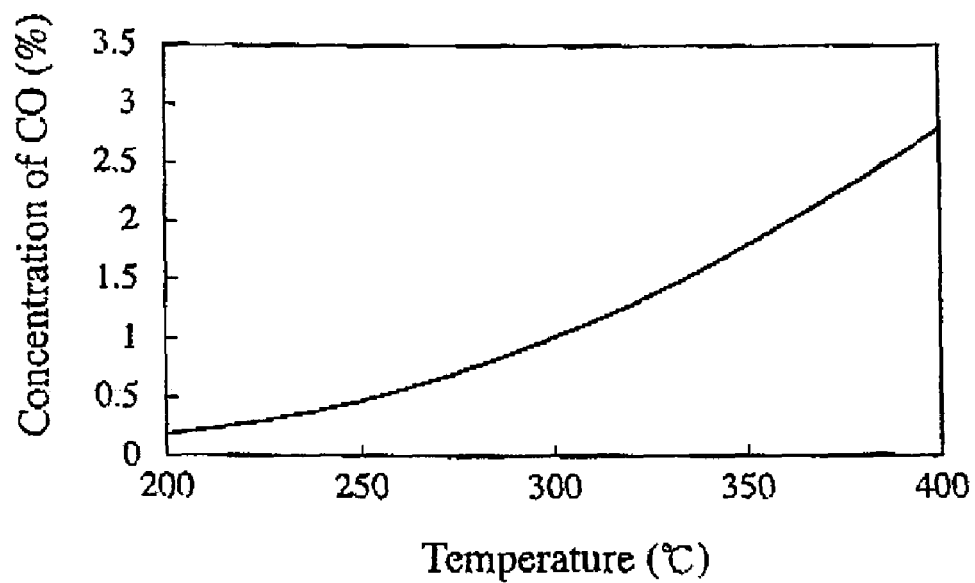
FIG. 4 is a graph showing an equilibrium curve of a reformed gas composition ($H_2$: 35%, CO: 6%, $CO_2$: 11%, $H_2O$: 23%, and $N_2$: 25%)

The shift catalysts per se may be known ones such as Pt, Pd, Rh, Ru, Cu—Zn-based catalysts, Fe—Cr-based catalysts, Cu—Cr-based catalysts, etc, 2 or more shift catalysts may be combined, and the different-stage shift catalyst beds may have different shift catalysts. FIG. 4 shows an equilibrium curve of a reformed gas composition ($H_2$: 35%, CO: 6%, $CO_2$: 11%, $H_2O$: 23%, $N_2$: 25%). As shown in FIG. 4, equilibrium shifts toward a lower concentration of CO as the reaction temperature becomes lower. A reverse shift reaction is thus suppressed at low temperatures, accelerating the shift reaction. However, the catalyst shows a lower activity and a reduced reaction rate at low temperatures. To achieve a higher catalytic activity for the shift reaction even at low temperatures, a catalyst supporting highly dispersed Pt is preferably used as the shift catalyst of each shift catalyst bed. Pt is preferably supported on an oxide carrier, whose examples are porous carriers of inorganic oxides such as alumina, titania, silica, zirconia and their combinations.

Because the shift catalyst beds are arranged in tanden in the present invention, the reaction temperature can be appropriately controlled in each catalyst bed to improve the shift reaction efficiency. As shown in FIG. 2, an upstream catalyst bed, into which CO and $H_2O$ are introduced, is preferably shorter in the gas flow direction than a downstream catalyst bed, from which the generated $H_2$ and $CO_2$ are discharged Thus, with a shorter catalyst bed disposed in an upstream stage having larger heat generation, into which CO and $H_2O$ are introduced, the equilibrium of the reaction shifts toward the reduction of heat generation and CO concentration. The downstream catalyst bed is elongated to accelerate the shift reaction. This arrangement of the catalyst beds can prevent a rapid CO-modifying reaction in the upstream catalyst bed, thereby avoiding the elevation of the catalyst temperature and the deterioration of the catalyst.

In the case of a partial oxidation reformer, water vapor is injected into the reformed gas between the reformer 11 and the carbon monoxide converter 12. A steam reformer utilizes water vapor contained in the reformed gas. Even when the reformed gas contains water vapor, additional water vapor may be introduced to accelerate the carbon monoxide conversion. Because of an exothermic shift reaction of carbon monoxide and water vapor in the reformed gas, a reverse shift reaction proceeds to increase the equilibrium concentration of CO at too high reaction temperatures. The deterioration of the catalyst is accelerated at high temperatures in the catalyst bed. Thus, a heat exchanger, in which the high-temperature reformed gas is circulated and cooled, is preferably disposed upstream of each shift catalyst bed, thereby controlling the gas temperature at the inlet of each catalyst bed (hereinafter referred to as inlet gas temperature) to avoid the temperature elevation of the catalyst.

The heat exchanger is not particularly limited as long as it can precisely control the inlet gas temperature of the catalyst bed. For example, the heat exchanger may have a cooling pipe or plate, etc., in which a cooling medium such as water is circulated, along a gas flow path. The heat exchanger preferably has a cooling pipe or plate with an appropriately controlled surface area and is operated at an appropriately controlled flow rate of the cooling medium to exhibit high heat exchange efficiency. Further, a temperature sensor may be disposed at the inlet of each catalyst bed to control the flow rate of the cooling medium or the supply rate of the reformed gas (CO gas) based on the change of the inlet gas temperature.

The heat exchangers used if necessary are preferably disposed upstream of each catalyst bed to precisely control its temperature. The structure of the carbon monoxide converter is not necessarily limited as described above, but may have a multistage stricture with 3 or more shift catalyst beds. Further, a mixing unit may be disposed between the shift catalyst beds to make the composition of the reformed gas uniform.

[3] Operation of Carbon Monoxide Converter

Figure 5:
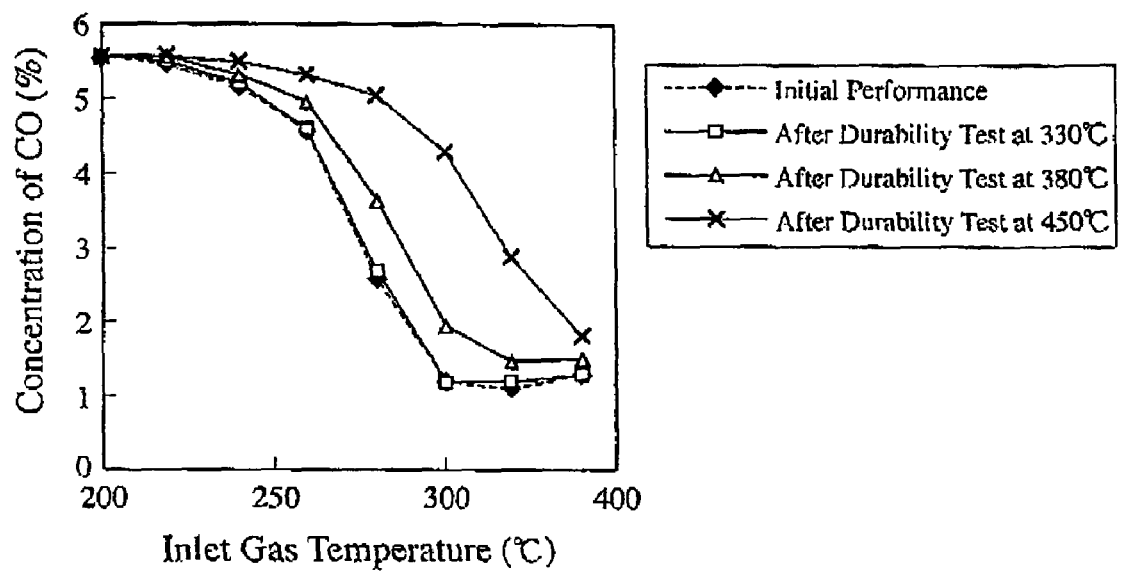
FIG. 5 is a graph showing relations between inlet gas temperatures and the concentration of CO after a durability test at shift catalyst temperatures of 330° C., 380° C. and 450° C., respectively.

The operation of the carbon monoxide converter of the present invention is described below. The reformed gas discharged from the reformer is mixed with water vapor, and supplied to the heat exchanger 31a of the carbon monoxide converter shown in FIG. 2. The reformed gas is cooled to a predetermined temperature by the heat exchanger 31a because the exothermic shift reaction puts the catalyst at high temperatures, which deteriorate the catalyst. FIG. 5 shows the performance changes of the Pt shift catalyst in durability tests at various catalyst temperatures. The durability tests at the catalyst temperatures of 330° C., 380° C. and 450° C. indicate that the higher catalyst temperature reduces the low-temperature activity, though substantially no reduction in the activity is observed at the catalyst temperature of 330° C. Thus, the catalyst temperatures of the shift catalyst beds are preferably controlled to 330° C. or lower to maintain the initial activity. The inlet gas temperature of the first-stage catalyst bed 32 should be controlled to maintain its catalyst temperature at 330° C. or lower. For example, the heat exchanger 31a cools the reformed gas based on data from a temperature sensor disposed at the inlet of the first-stage catalyst bed 32, preferably while limiting the supply rate of the reformed gas (CO gas), thereby controlling the inlet gas temperature.

The CO gas concentration at the outlet of the shift catalyst bed 32 is nearly half of that at the outlet of the reformer by the shift reaction in the shift catalyst bed 32. The reformed gas is then introduced into the heat exchanger 31b, in which it is cooled to a predetermined temperature, and supplied to the second-stage shift catalyst bed 33. The supplied reformed gas has so lowered CO concentration that the reaction temperature is not rapidly increased in the second-stage catalyst bed 33 unlike in the first-stage catalyst bed 32. Therefore, the inlet gas temperature of the second-stage catalyst bed 33, which is controlled by the heat exchanger 31b, may be higher than that of the first-stage catalyst bed 32. Further, the carbon monoxide shift reaction can be accelerated by making the second-stage catalyst bed 33 longer than the first-stage catalyst bed 32 in the gas flow direction.

The present invention will be described in more detail below with reference to Examples without intention of restricting the scope of the present invention.

REFERENCE EXAMPLE 1

Figure 3:
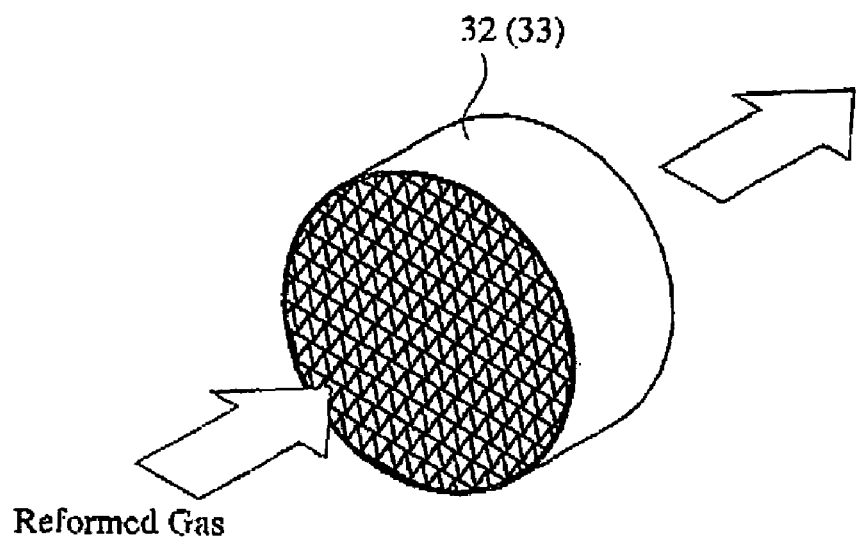
FIG. 3 is a schematic perspective view showing al example of shift catalyst beds contained in the carbon monoxide converter of the present invention.

A shift catalyst layer was formed on walls of the honeycomb shown in FIG. 3 to produce a shift catalyst bed. The shift catalyst was composed of highly dispersed Pt supported on an alumina carrier. The shift catalyst bed was subjected to 100-hour durability tests at catalyst temperatures of 330° C., 380° C., and 450° C. to examine relations between the catalyst temperatures and the deterioration of performance. The results are shown in FIG. 5. Though substantially no changes were observed at the catalyst temperature of 330° C., the deterioration of performance was observed at the catalyst temperatures of 380° C. and 450° C. The transmission-electron-microscopic (TEM) observation of the shift catalysts subjected to the durability tests at 330° C., 380° C. and 450° C. indicates that Pt was more sintered at higher temperatures, causing deterioration due to the agglomeration of Pt on the carrier surface.

EXAMPLE 1

(1) Production of Carbon Monoxide Converter

FIG. 2 shows the structure of a carbon monoxide converter used herein, which comprises a heat exchanger 31a, a shift catalyst bed 32, a heat exchanger 31b, and a shift catalyst bed 33 in this order in a flow direction of a reformed gas. The same shift catalyst as in Reference Example 1 was used. The shift catalyst bed 32 was obtained by forming a shift catalyst layer on walls of a honeycomb of 198 mm in diameter and 30 mm in length, and the shift catalyst bed 33 was obtained by forming a shift catalyst layer on walls of a honeycomb of 198 mm in diameter and 60 mm in length. The heat exchangers 31a and 31b were coiled pipes formed in the flow path of the reformed gas. Temperature sensors (not shown) were disposed at the inlets of the shift catalyst beds 32 and 33 as well as therein, and CO concentration sensors (not shown) were disposed at the outlets of the shift catalyst beds 32 and 33. Further provided was a unit (not shown) for controlling the flow rates of cooling water and the reformed gas in the heat exchangers 31a and 31b based on data from the temperature sensors and the CO concentration sensors. The structures of the shift catalyst beds in the carbon monoxide converter are shown in Table 1.

(2) Evaluation

Figure 6:
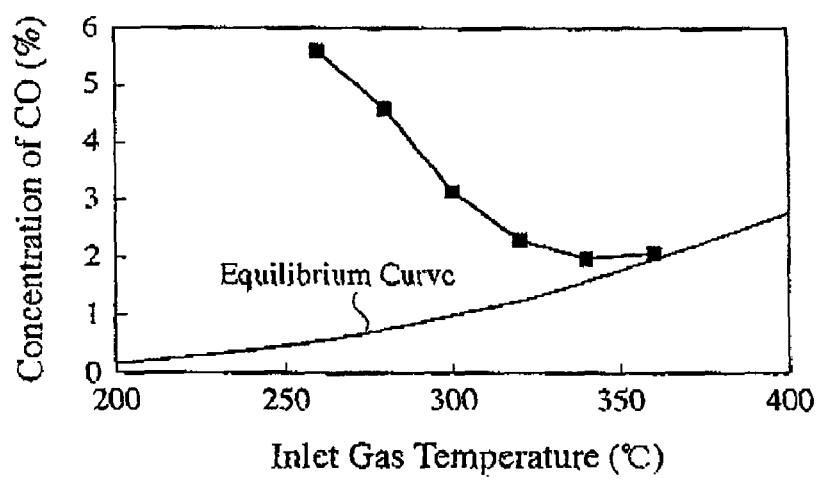
FIG. 6 is a graph showing a relation between an inlet gas temperature and the concentration of CO in the first-stage shift catalyst bed in the carbon monoxide converter of Example 1.

A reformed gas ($H_2$: 35%, CO: 6%, $CO_2$: 11%, $H_2O$: 23%, $N_2$: 25%) discharged from a reformer at a flow rate of 1.5 L/minute was mixed with water vapor and supplied to the heat exchanger 31a of the carbon monoxide converter. With the flow rate of the cooling water given by the control unit to the heat exchanger 31a based on data from the temperature sensor disposed at the inlet of the shift catalyst bed 32, the inlet gas temperature of the shift catalyst bed 32 was controlled within a range of 260° C. to 360° C. The evaluation results of the performance of the shift catalyst bed 32 are shown in FIG. 6.

When the inlet gas temperature of the shift catalyst bed 32 was changed within 260° C. to 360° C., the elevation of the inlet gas temperature reduced the concentration of CO, while also increasing the catalyst temperature. It was found that the inlet gas temperature of the shift catalyst bed 32 had to be controlled to 300° C. or lower to maintain the catalyst temperature at 330° C. or lower.

Figure 7:
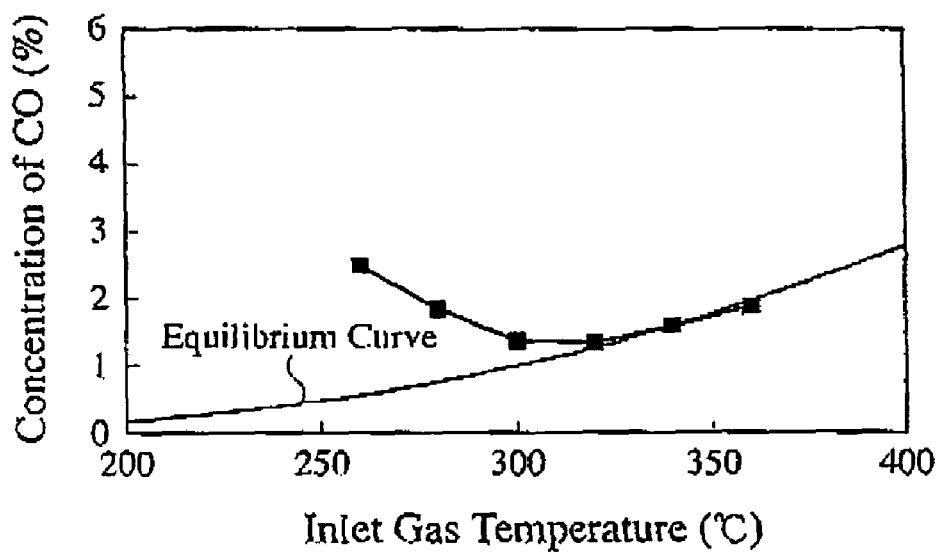
FIG. 7 is a graph showing a relation between an inlet gas temperature and the concentration of CO in the second-stage shift catalyst bed in the carbon monoxide converter of Example 1.

The inlet gas temperature of the shift catalyst bed 32 was controlled to 300° C., and the reformed gas discharged from the shift catalyst bed 32, which had a CO concentration of 3.2% at the outlet of the shift catalyst bed 32, was supplied to the heat exchanger 31b and then to the shift catalyst bed 33. The flow rate of the cooling water was given by the control unit to the heat exchanger 31b based on data from the temperature sensor disposed at the inlet of the shift catalyst bed 33, so that the inlet gas temperature of the shift catalyst bed 33 was controlled within a range of 260 to 360° C. The results of evaluating performance of the shift catalyst bed 33 are shown in FIG. 7.

The elevation of the inlet gas temperature reduced the concentration of CO at the inlet gas temperature of the shift catalyst bed 33 in a range of 260 to 360° C., though a reverse shift reaction remarkably proceeded at higher than 320° C., thereby increasing the CO concentration. The catalyst temperature increased along with the inlet gas temperature, necessitating to control the inlet gas temperature of the shift catalyst bed 33 to 320° C. or lower to maintain the catalyst temperature at 330° C. or lower.

With the inlet gas temperature of the shift catalyst bed 32 controlled to 300° C. and the inlet gas temperature of the shift catalyst bed 33 to 320° C., the above reformed gas was introduced into the carbon monoxide converter produced in (1). As a result, the concentration of a CO gas in the reformed gas was reduced from 6% to 1.3%. The evaluation of the concentration of a CO gas in the reformed gas after the carbon monoxide converter was operated for 100 hours revealed that there was no deterioration of performance.

COMPARATIVE EXAMPLE 1

Figure 8:
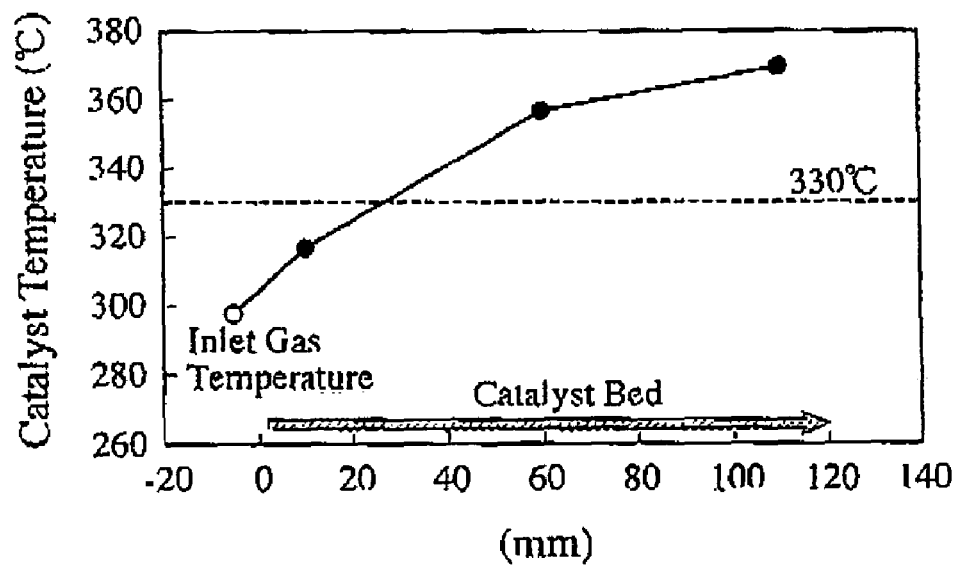
FIG. 8 is a graph showing a temperature distribution in a gas flow direction in a shift catalyst bed of the carbon monoxide converter of Comparative Example 1.
Figure 9:
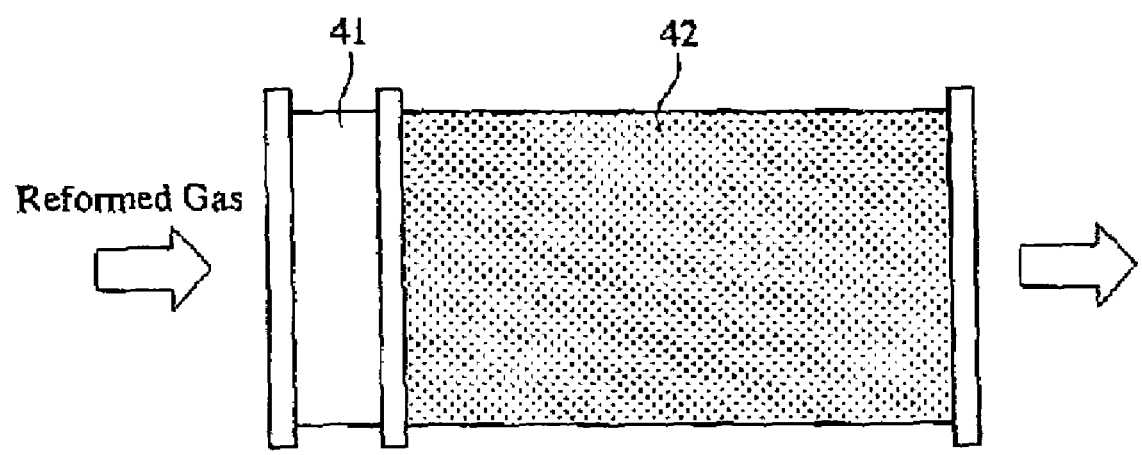
FIG. 9 is a schematic view showing the structure of the carbon monoxide converter of Comparative Example 1.

A carbon monoxide converter shown in FIG. 9 was produced in the same manner as in Example 1, except that a beat exchanger 41 was disposed upstream of a single-stage shift catalyst bed 42 of 198 mm in diameter and 120 mm in length. The structure of the shift catalyst bed in the carbon monoxide converter is shown in Table 1. A reformed gas ($H_2$: 35%, CO: 6%, $CO_2$: 11%, $H_2O$: 23%, $N_2$: 25%) discharged from a reformer at a flow rate of 1.5 L/minute was mixed with water vapor and supplied to the heat exchanger 41 of the carbon monoxide converter. With the flow rate of the cooling water given by the control unit to the heat exchanger 41 based on data from the temperature sensor disposed at the inlet of the shift catalyst bed 42, the inlet gas temperature of the shift catalyst bed 42 was controlled to 300° C. The catalyst temperature distribution in the gas flow direction of the shift catalyst bed is shown in FIG. 8.

As shown in FIG. 8, the catalyst temperature was higher than 350° C. in the downstream part of the catalyst bed. When the above reformed gas was supplied to the carbon monoxide converter, the concentration of a CO gas in the reformed gas was reduced from 6% to 1.5% at an initial performance. however, after the carbon monoxide converter was operated for 100 hours, the concentration of a CO gas in the reformed gas was reduced only to 2.2%, with clear deterioration of performance.

TABLE 1

| | No. | Diameter (mm) | Length (mm) | Total SV (L/hr)[1] | Amount of Catalyst (L) |
|---|---|---|---|---|---|
| Serial Two-Stage Structure | Example 1 | 198 | 30 + 60 | 27,000 | 2.8 |
| Single-Stage Structure | Comparative Example 1 | 198 | 120 | 20,000 | 3.7 |

Note:
[1]SV is a surface velocity of reformed gas.

The comparison of the carbon monoxide converters of Example 1 and Comparative Example 1 indicates, as is clear from Table 1, that the carbon monoxide converter of Example 1 having two shift catalyst beds in tandem can convert CO in the reformed gas to $H_2$ under a high load, requiring a remarkably smaller amount of the catalyst than in the carbon monoxide converter of Comparative Example 1 having a single-stage shift catalyst bed.

As described above, the carbon monoxide converter of the present invention comprising shift catalyst beds in tandem can so precisely control the temperatures of the shift catalysts that the shift catalysts are not exposed to high temperatures and thus not deteriorated. The carbon monoxide converter can highly efficiently reduce carbon monoxide by a shift reaction in a preferable temperature range with drastically reduced amounts of the catalysts.

What is claimed is:

1. A carbon monoxide converter comprising shift catalyst beds arranged in tandem for conducting a shift reaction for converting CO and $H_2O$ to $H_2$ and $CO_2$,
    wherein said shift catalyst beds are arranged in a gas flow direction such that they are shorter on the upstream side, on which a gas containing CO and $H_2O$ is introduced, and longer on the downstream side, on which a gas containing the produced $H_2$ and $CO_2$ is discharged,
    wherein a heat exchanger is disposed upstream of each shift catalyst bed, and
    wherein the temperatures of said shift catalyst beds are controlled during the shift reaction and a gas containing $CO_2$ and $H_2O$ discharged from the carbon monoxide converter is introduced into a carbon-monoxide-oxidizing unit, and
    wherein temperature sensors are disposed at the inlets of said shift catalyst beds as well as therein, respectively, and CO concentration sensors are disposed at the outlets of said shift catalyst beds, and further a unit for controlling the flow rates of cooling water and the reformed gas in the heat exchangers based on data from said temperature sensors and said CO concentration sensors is provided.

2. The carbon monoxide converter according to claim 1, wherein the temperatures of said shift catalyst beds are controlled to 330° C. or lower during the shift reaction using said temperature sensors disposed at the inlets of said shift catalyst beds as well as therein, respectively.

3. The carbon monoxide converter according to claim 1, wherein said shift catalyst beds contain a shift catalyst of Pt supported on an oxide carrier.

4. The carbon monoxide converter according to claim 1, wherein each shift catalyst bed comprises a different shift catalyst.

* * * * *